July 11, 1967  TSUTOMU KUWATA ETAL  3,330,774
METHOD AND APPARATUS FOR PREPARING SILICA-ALUMINA
TYPE SPHERICAL HYDROGELS
Filed July 23, 1963  6 Sheets-Sheet 1
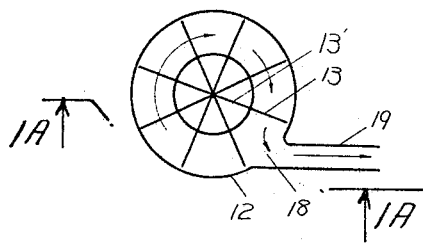
Fig 2
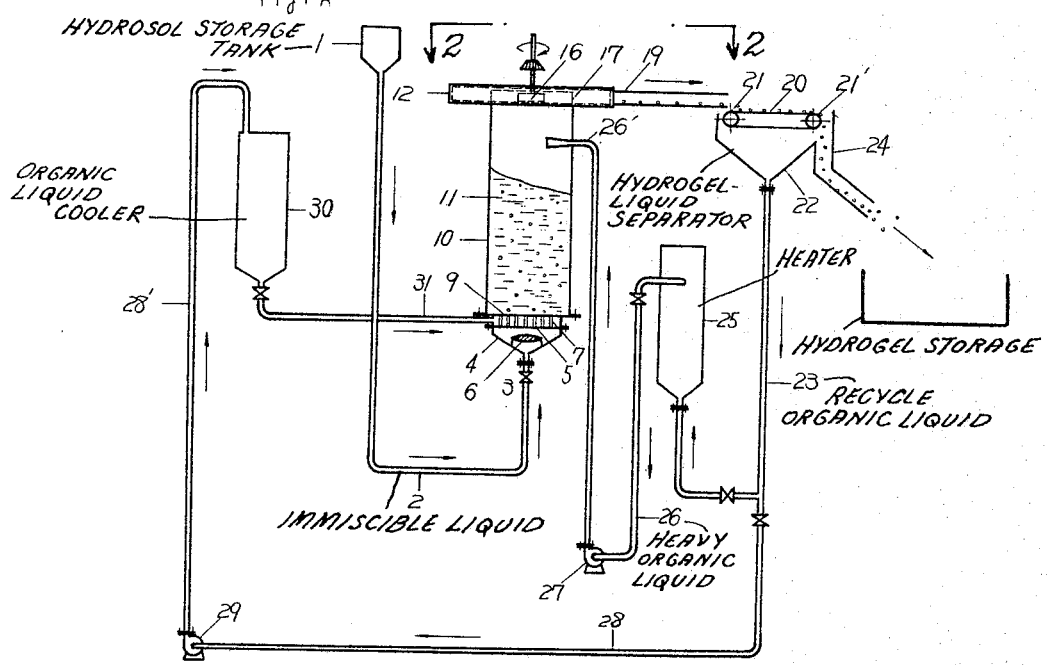
Fig 1-A
INVENTORS
TSUTOMU KUWATA
YUTIRO SUGAHARA
TADAHISA NAKAZAWA
BY
ATTORNEY

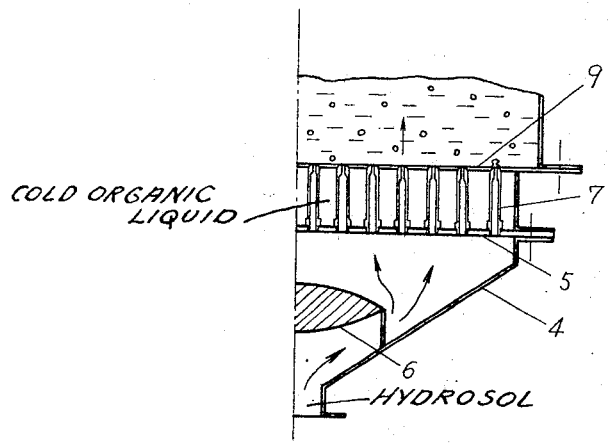
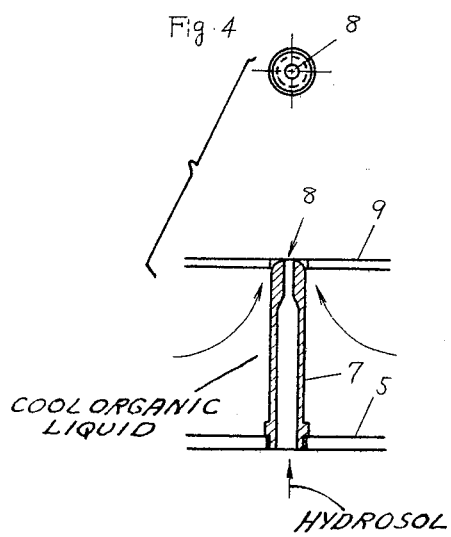
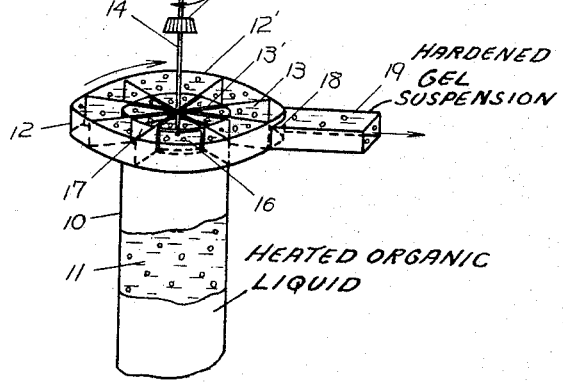

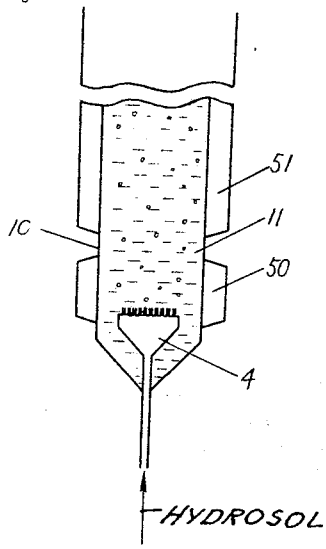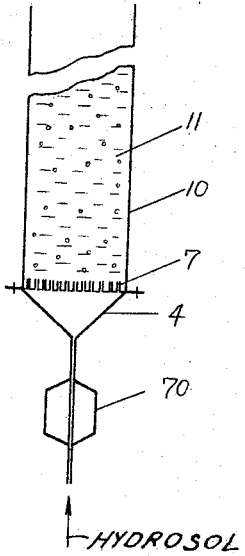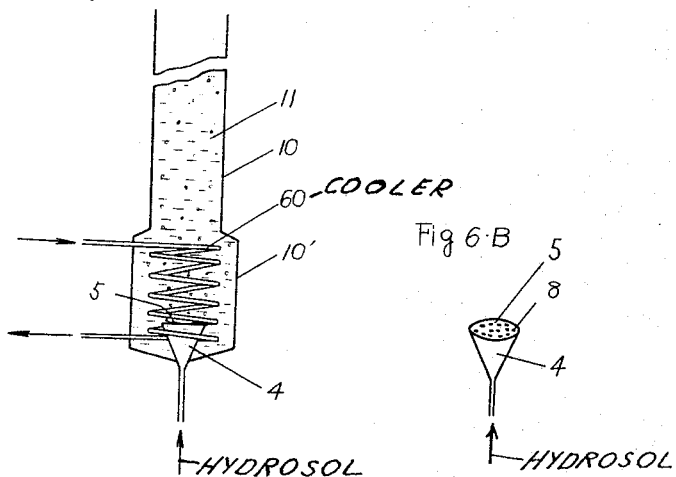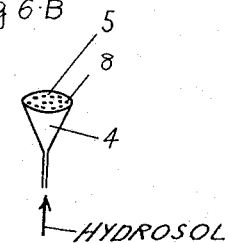

GEL STORAGE 3,330,774
METHOD AND APPARATUS FOR PREPARING SILICA-ALUMINA TYPE SPHERICAL HYDROGELS
Tsutomu Kuwata, Shinagawa-ku, Tokyo, Yujiro Sugahara, Tsuruoka-shi, Yamagata-ken, and Tadahisa Nakazawa, Kitakanbara-gun, Niigata-ken, Japan, assignors to Mizusawa Kagaku Kogyo Kabushiki Kaisha, Osaka, Japan, a corporation of Japan
Filed July 23, 1963, Ser. No. 297,037
Claims priority, application Japan, Feb. 21, 1963, 38/7,529
1 Claim. (Cl. 252—359)

This invention relates to a method of preparing silica-alumina type hydrogels and apparatus therefor. More particularly, the invention relates to a method of using as starting materials a hydrosol of a basic aluminum sulfate having the following composition

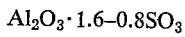

and a silica hydrosol and preparing therefrom on a commercial scale spherical hydrogels which are not deformed and which possess pressure resistance intensity; and to an apparatus for preparing these spherical hydrogels.

We previously found that a hydrosol of a basic aluminum sulfate having the following composition

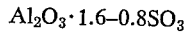

would hydrogel with exceeding acuteness upon heating, and by taking advantage of this characteristic we found a method of preparing hydrogels from hydrosols containing alumina and silica in varying proportions and by treating the so obtained hydrogels to prepare these spherical active gels.

As such a hydrosol, that having the following composition can be used; namely

A silica-alumina type hydrosol comprising (A) a hydrosol containing a basic aluminum sulfate whose composition is $Al_2O_3 \cdot 1.6\text{–}0.8SO_3$ wherein is contained, as $Al_2O_3$ 4–20 grams of $Al_2O_3$ per 100 cc. of said hydrosol and (B) a hydrosol of silica of a pH of 0.5–4.0 containing, as $SiO_2$, 1–20 grams of $SiO_2$ per 100 cc. of said hydrosol, the $Al_2O_3$ and $SiO_2$ being contained in a proportion, on a weight basis, as expressed by $$[100-1.2] \cdot A + [0-98.8] \cdot B$$

A primary object of this invention is to provide a method and apparatus for preparing on a commercial scale and with ease spherical hydrogels without deformation, using the silica-alumina type hydrosol of the aforementioned composition.

Other objects and advantages of the present invention will become apparent from the following detailed description taken with the accompanying drawings wherein:

FIG. 1–A is a schematic view illustrating one embodiment of an apparatus of this invention;

FIG. 1–B being a magnified sectional view of the hydrosol discharging device part of the apparatus shown in FIG. 1–A;

FIG. 2 being a plan view of the circular vessel part of the apparatus of FIG. 1;

FIG. 3 being a perspective view of the circular vessel and the top part of the primary gelation tower of the apparatus of FIG. 1;

FIG. 4 being a magnified view showing the orifices for discharging the hydrosol and a part of the cooling mechanism thereof of the apparatus shown in FIG. 1; and FIGS. 5, 6 and 7 each illustrating other embodiments of the orifice part and cooling mechanism thereof of the hydrosol discharging device.

FIG. 8 is a schematic view illustrating another embodiment of the apparatus of this invention;

FIG. 9 being a plan view of the circular vessel part of the apparatus of FIG. 8; and FIG. 10 being a perspective view of the circular vessel and the top part of the primary gelation tower.

FIG. 11 is a sectional view illustrating a still another embodiment in which the arrangement of the top part of the primary gelation tower and the circular vessel differs from those shown in FIGS. 1 and 8;

FIG. 12 being a plan view of FIG. 11.

FIG. 13 is a side elevational view illustrating an embodiment of a yet another differing arrangement of the primary gelation tower and the circular vessel;

FIG. 14 being a plan view of FIG. 13.

Figure 9:
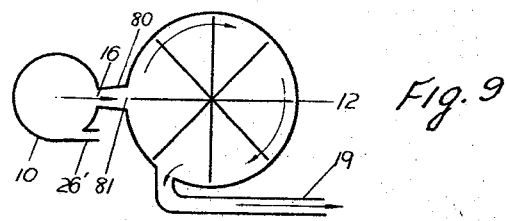

In preparing spherical hydrogels by using the hydrosol of the aforementioned composition, the usually conceivable method is that comprising dropping said hydrosol into a heated organic liquid from above to effect hydrogelation in the meantime. At this time, when the hydrosol is dropped to the surface of a heated organic liquid from an orifice of a discharging means for the hydrosol provided above and spaced apart from the surface of said heated organic liquid, the hydrosol plunges into the heated liquid and in forming a sphere by means of its own surface tension, in a part of the sphere occurs a navel-like depression in which is enveloped the organic liquid. (See reference numeral 161 in FIG. 16.) Since this navel-like depression does not disappear until the end, it is also retained in the silica-alumina type spherical hydrogel and hence becomes a defect whereby the pressure resistance intensity of the product is reduced considerably.

Moreover, as the organic liquid retained in the spherical hydrogel cannot be removed without destruction of the product, not only is the product contaminated but also the organic liquid is lost, thus becoming a cause for a rise in the production cost.

On the other hand, by immersing the orifices of the hydrosol discharging means in the heated organic liquid the entry of the organic liquid in the spherical hydrogels with the formation of the navel-like depressions can be prevented. In this case, however, as the hydrosol discharging means as well as its orifices is heated, the hydrosol turns to hydrogels at the orifices portion so that a continuous operation over an extended period of hours becomes impossible.

Additionally, since in the hereinbefore described method of dropping the hydrosol from above into a heated organic liquid located below, the hydrosol makes abrupt contact with the organic liquid, the formation time of the sphere in the hydrosol state becomes exceedingly small, i.e., the gelling occurs before there is sufficient time for the hydrosol to become a perfect sphere. Hence, it becomes difficult to obtain hydrogels of perfect spherical shape. In order to make perfect spherical hydrogels, preferably a time of one second, i.e., in terms of the height of the organic liquid layer of about 10 cm., should be allowed and a gelatin initiating temperature of below 40° C. should be maintained.

For overcoming the foregoing fault, a method of extruding the hydrosol by providing a discharing means below the heated organic liquid has also been attempted.

In this case also, it was not possible to prevent the clogging of the orifices of the discharging means.

Again, the hydrosol extruded into the heated organic liquid becomes a spherical sol on account of its own surface tension and soon thereafter the gelation thereof begins from the surface of the sphere. However, if the heating time is insufficient in this case, the core of the sphere does not become completely hydrogelled. Hence, if the organic liquid is removed immediately therefrom, or the other steps including the washing, alkali treatment and drying steps are carried out, the particles of the spherical hydrogels either are deformed or damaged by means of the external force to which the particles are subjected to incident to the accomplishment of these steps. Even though deformation does not occur, owing to the heterogeneity of the structure of the hydrogels forming the spherical particles, it becomes a major cause of the breakage of the gels and lowering of the pressure resistance intensity thereof. On the other hand, if the heating time is too long, the hydrogels, on the contrary, become either soft or various difficulties such as syneresis phenomenon, etc. occur to noticeably lower the quality of the product.

In consequence of having furthered our investigations into a method of using a hydrosol of the aforementioned composition to prepare commercially spherical hydrogels which are not deformed, we found that silica-alumina type spherical hydrogels which are not deformed could be obtained by a procedure which comprises extruding a silica-alumina type hydrosol comprising (A) a hydrosol containing a basic aluminum sulfate whose composition is $Al_2O_3 \cdot 1.6-0.8SO_3$ wherein is contained, as $Al_2O_3$, 4–20 grams of $Al_2O_3$ per 100 cc. of said hydrosol and (B) a hydrosol of silica having a pH of 0.5–4.0 containing, as $SiO_2$, 1–20 grams of $SiO_2$ per 100 cc. of said hydrosol, the $Al_2O_3$ and $SiO_2$ being contained in a proportion on a weight basis, as expressed by $$[100-1.2] \cdot A + [0-98.8] \cdot B$$

directly through an orifice into the bottom of an organic liquid whose specific gravity is greater than that of said hydrosol and which is immiscible with respect thereto, causing the spherical hydrosol formed to rise up through the organic liquid, in the meantime cooling the temperature of the organic liquid in the environs of said orifice to a maximum of 30° C. and preferably to below 20° C. while heating at least the upper part of said organic liquid to a temperature of 40–100° C., thereby gelling the surface of the hydrosol during its rise to the surface to such an extent that, at least at the liquid surface, deformation or breakage does not occur of its ownself or by collision with each other, and thereafter holding the surfaced spherical gel in a heated organic liquid for 2–90 minutes.

The method of the present invention is described in further detail hereinafter.

*Stock hydrosol*

This invention uses as its starting material a hydrosol obtained by mixing an aqueous colloidal solution of basic aluminum sulfate, hereinabove described as hydrosol (A), and a silica sol, hereinabove described as hydrosol (B), in an optional proportion within the scope in which $Al_2O_3$ and $SiO_2$ are contained, on a weight basis, as expressed by $[100-1.2] \cdot A + [0-98.8] \cdot B$.

The aforementioned hydrosol (A) is obtained industrially by gradually adding with vigorous stirring powdered calcium carbonate to a concentrated aqueous solution of aluminum sulfate and then while maintaining only the alumina portion in a soluble state precipitating as gypsum the sulfate ions to obtain the aforesaid hydrosol as a supernatant liquid. When shown as a chemical equation, it is as follows:

$$Al_2O_3 \cdot 3SO_3 + CaCO_3 \rightarrow Al_2O_3 \cdot 1.6-0.8SO_3 + CaSO_4 \cdot 2H_2O + CO_2$$

If the concentration of the aqueous aluminum sulfate solution is diluted too much, the objective cannot be achieved, since the $Al_2O_3$ portion also precipitates before the $SO_3/Al_2O_3$, on a molar basis, becomes sufficiently small. Preferably the concentration of aluminum sulfate, in terms of $Al_2O_3$, should be above 6 grams per 100 cc. of the solution, and that which is at or near the saturation point at room temperature is particularly suitable.

Moreover, even if there are present in the material aluminum sulfate water-soluble sulfates the solution of which are close to neutral, such as $Na'$, $K'$, $Mg''$, $Zn''$, $Fe''$, $NH_4'$, etc., no harm will be done in preparing the stock basic aluminum sulfate sol.

The ratio of the $SO_3$ (sulfate ion) to the $Al_2O_3$ of the stock basic aluminum sol becomes a very important factor in the preparation of spherical hydrogels. Namely, if the $SO_3/Al_2O_3$, on a molar basis, is larger than 1.6, the unique phenomenon of hydrogelling is not manifested upon heating, or even though manifested, the hydrogels formed are too soft. Thus, perfect spherical gels cannot be made.

In view of the above reason, while it is desirable that the ratio of the $SO_3$ (sulfate ion) to the $Al_2O_3$ contained in the aforementioned hydrosol (A) be made small, if attempts are made to lower the $SO_3/Al_2O_3$, on a molar basis, forcibly to below 0.8, there is the possibility of precipitating the $Al_2O_3$ portion. Therefore, the proper range of $SO_3/Al_2O_3$, on a molar basis, should be from 1.6 to 0.8. While the basic aluminum sulfate hydrosol is usually prepared by reacting an aqueous aluminum sulfate solution with calcium carbonate, it is also possible to prepare hydrosol (A) by adding a small amount of magnesium carbonate, sodium bicarbonate, ammonium carbonate, etc. and adjusting the $SO_3/Al_2O_3$ molar ratio of those aqueous basic aluminum sulfate solutions whose $SO_3/Al_2O_3$ molar ratios are relatively great, namely, there is that which is prepared by reacting an aqueous aluminum sulfate solution with a comparatively small amount of calcium carbonate or that which is prepared by reacting sulfuric acid with metallic aluminum or aluminum hydroxide for a long period of hours. The pH of hydrosol (A) usually lies between 2.8 and 4.0.

On the other hand, the aforementioned hydrosol (B) can be prepared readily by gradually adding with stirring sodium silicate to an acid (sulfuric acid usually being used) and adjusting the final pH to 0.5–4.0. If the final pH exceeds 4.0, the stability of the hydrosol obtained is unsatisfactory and since it hydrogels on standing, it is not fit for use. On the other hand, a pH of below 0.5 signifies the presence of a superfluity of free acids, and since this has an action of weakening the unique character possessed by said hydrosol (A), i.e., of gelling to take place upon being heated, it is undesirable. Hence, the most desirable pH for hydrosol (B) is 1–3.

The concentration of hydrosol (B) varies with the proportion in which hydrosol (A) is mixed. Namely, when a relatively small amount of hydrosol (B) is to be added to hydrosol (A), the concentration of (B) may be so dilute as to contain, in terms of $SiO_2$, 1 gram of $SiO_2$ per 100 cc. of the hydrosol. But, if it is too dilute, it would not be desirable since it would depart from the primary object of adding $SiO_2$ to $Al_2O_3$, as it would amount to just adding water. On the other hand, when a small amount of hydrosol (A) is added to hydrosol (B) and used as the stock hydrosol, if the concentration of (B) is too dilute, the hardness of the resulting spherical hydrogels becomes markedly reduced and hence it is unsuitable. The concentration of (B), in terms of the $SiO_2$, preferably should be above 5 grams per 100 cc. of the total hydrosol. On the other hand, when the concentration of (B) becomes so concentrated as to contain, in terms of the $SiO_2$, above 20 grams per 100 cc. of the hydrosol, the stability of (B) becomes impaired such that it gels on standing and hence is not desirable.

The concentration of hydrosol (B) may be suitably selected such that the total of the $Al_2O_3$ and $SiO_2$ in the stock hydrosol becomes 5 grams to 20 grams per 100 cc. of the total hydrosol. By doing thus, it becomes possible to prepare spherical hydrogels of a high degree of hardness.

The proportion in which hydrosols (A) and (B) are mixed, as hereinabove described, in terms of $Al_2O_3/SiO_2$, can be selected at an optional point within the range between 100/0 and 1.2/98.8 as expressed in weight ratios. When the ratio $Al_2O_3/SiO_2$ (weight) is 100/0, an alumina type hydrogel not containing $SiO_2$ is obtained, whereas, when the ratio $Al_2O_3/SiO_2$ (weight) is 1.2/98.8, a silica-alumina type hydrogel which is very rich in $SiO_2$ is obtained. What must be noted here, however, is that only hydrosol (A) manifests the phenomenon of gelling acutely on heating, such a capacity not being possessed by hydrosol (B). Therefore, while it is possible to use hydrosol (A) alone as the stock hydrosol of this invention, hydrosol (B) cannot be used alone according to this invention. Thus, as hereinabove described, it becomes an indispensable condition that hydrosol (A) is contained in the stock hydrosol such that the proportion in which $Al_2O_3$ and $SiO_2$ contained therein, i.e., the weight ratio of $Al_2O_3/SiO_2$, becomes not less than 1.2/98.8.

However, as hereinafter described, it is possible to make spherical hydrogels of pure silica by using the foregoing stock hydrosol, making it into spherical hydrogels in a heated organic liquid, and thereafter extracting the alumina portion contained therein by means of an acid treatment or other suitable procedure without changing the shape of the hydrogels.

Although the pH of the stock hydrosol varies with the proportion in which hydrosols (A) and (B) are mixed, it will approach that of hydrosol (A) on account of the strong buffer effect of hydrosol (A).

*Organic liquid*

Although as the organic liquid to be used in the present invention any which is not miscible with water and moreover which does not react with the stock hydrosol and which has a greater specific gravity than that of the stock hydrosol may be used, for use on an industrial scale it is preferable that it is one which possesses the following characteristics: namely, that it does not adhere to the formed hydrogels, that its viscosity is low so as to prevent its loss, and its boiling point high so as to minimize the loss in case of heating, and further, if possible, that it is nonpoisonous, low in cost and noncombustible. As organic liquids satisfying the foregoing conditions, suitable are di- or trichlorobenzene used alone or as a mixed liquid of these with petroleum hydrocarbons. Carbon tetrachloride, chloroform and acetylene tetrachloride being deadly toxic as well as being low in their boiling points are undesirable, while chlorinated paraffin is not desirable because of its high viscosity. As the petroleum hydrocarbons to be mixed with di- or trichlorobenzene, kerosene, light oil, or spindle oil are all suitable.

*Gelation conditions*

The stock hydrosol is directly extruded into the organic liquid from an orifice of the hydrosol discharging means provided below the organic liquid. Since the hydrosol has a characteristic that it gels on being heated, the aforementioned discharging means and the organic liquid in the environs of the orifices of said discharging means must be cooled to below 30° C., and preferably below 20° C. The hydrosol extruded from the orifices becomes by means of its own surface tension sphere-shaped in the cold organic liquid. The size of the spheres depends on the size of the orifice through which the stock hydrosol is extruded, the difference in specific gravities of the hydrosol and the organic liquid, the viscosity and surface tension of the hydrosol, etc., the diameter of the hydrogels being freely controllable within the range of from 2 mm. to 30 mm.

The hydrosol which has been extruded into the organic liquid and become sphere-shaped, by being heated to a temperature of 40–100° C. during the time it gradually rises up through the organic liquid must be gelled in its surface portion (primary gelation) until it reaches the surface of the liquid to such an extent that it at least is not deformed or broken by itself or by colliding with each other when it reaches the surface of the liquid. It is inadvisable to raise the temperature of the organic liquid to above 100° C., since there is the danger that the structure of the hydrogel will be broken in part as a result of the rapid vaporization of the moisture contained therein.

Hence, with respect to the aforementioned stock hydrosol which contains the foregoing hydrosols A and B in a ratio of $[100-1.2] \cdot A + [0-98.8] \cdot B$ the following inequality holds between the height of the stratum of the organic liquid heated to above 40° C., the average temperature of that portion of the organic liquid heated to above 40° C. and the diameter of the hydrosols at the time of the primary gelation, i.e., the gelation which takes place during the rise of the hydrosols through the organic liquid to its surface.

$$h > \frac{(d_1 - d_2) \cdot D}{t - 40} \times 30{,}000$$

wherein $h$ is the height in centimeters of the layer of that portion of the organic liquid heated to above 40° C.;

$t$ is the average temperature in ° C. of that portion of the organic liquid heated to above 40° C.;

$d_1$ is the specific gravity of the organic liquid at $t$ ° C.;

$d_2$ is the specific gravity of the stock hydrosol at room temperature (20° C.); and $D$ is the diameter in centimeters of the spherical particles.

Taking as an example a typical instance, i.e., when the diameter of the hydrogels is 0.8–1.5 centimeters and the average temperature of that portion of the organic liquid which has been heated is 70° C., the usual practice in consideration of reliability and economy is to select as the total height of the tower from the industrial standpoint one which is from 3 to 5 meters.

The hydrogels which have risen to the surface of the organic liquid after having completed the primary gelation are immediately followed by heating in a heated organic liquid whereby the secondary gelation is effected.

The following inequality holds between the heating time, the temperature of the organic liquid and the diameter of the hydrogels with respect to the foregoing stock hydrosol during its secondary gelation.

$$t > \frac{D^2}{t - 50} \times 120$$

wherein $T$ is the heating time in minutes of the hydrogel (i.e., the secondary gelation time);

$t$ is the temperature in ° C. of the organic liquid which is heating the hydrogels; and $D$ is the diameter in centimeters of the spherical particles.

As hereinbefore described, while the product quality is gradually degraded by the softening of the hydrogels or the occurrence of the syneresis phenomenon if the secondary gelation time is unduly prolonged, fatal defects do not occur promptly as in the case of an insufficient gelation time. Taking as an example a typical case, i.e., when the diameter of the hydrogels is 0.8–1.5 cm. and the heating temperature is 85° C., the preferred heating time is 6–20 minutes.

Hereinafter will be described a commercial scale apparatus that most suitably meets the various conditions which must be satisfied in preparing the aforementioned spherical hydrogels by using the aforesaid stock hydrosol. However, it is not intended to limit the apparatus of this invention to the use of hydrosols of basic aluminum sulfate having the compositon $Al_2O_3 \cdot 1.6-0.8SO_3$ alone or to those hydrosols containing the same but is possible of application to any and all cases in which spherical hydrogels are prepared from any hydrosol that can be hydrogelled by heating. In addition, the apparatus of this invention can also be employed for the production any and all solidified spherical products obtained from a liquid whose hardening is by means of heat.

The apparatus for preparing hydrogels of this invention comprises a means having numerous orifices opening upwardly for discharging hydrosol which is capable of hydrogelation by heating, a cooling means for cooling the numerous orifices of the discharging means, a primary gelation tower for holding the heated organic liquid which is immiscible with the hydrosol, said tower being disposed above said hydrosol discharging means and said numerous orifices opening directly into said tower, a circular vessel (secondary gelation means) having an inlet and an outlet adapted respectively for the inflow thereinto from the top of the primary gelation tower of the organic liquid and the spherical particles formed and the outflow thereof, and a rotatable partitioning member which partitions said circular vessel in numerous sections.

For a clearer understanding of the apparatus of this invention, an embodiment thereof will be described in reference to FIGS. 1-A to FIG. 4.

In FIG. 1-A, the hydrosol capable of hydrogelation, for example, a hydrosol containing the foregoing hydrosols A and B is a proportion of $[100-1.2] \cdot A + [0-98.8] \cdot B$, is placed in a storage tank 1 from whence it is conducted via pipe 2 to a hydrosol discharging device 4 in suitable quantities by regulating a valve 3. As shown by a magnified view in FIG. 1-B, the hydrosol discharging device 4 is funnel-shaped and in its top plate 5 are provided numerous tubes 7 which are open at the upper end. The hydrosol passes through these tubes 7 and is discharged upwardly from orifices 8. Baffles 6 are provided in the discharging device 4 and are adapted to rectify the stream of hydrosol introduced into the discharging device 4 from pipe 2 thereby ensuring that the hydrosol passing through the numerous tubes 7 provided in the top plate and extruded is extruded at a uniform pressure and rate of flow through all of the tubes 7.

Provided above the hydrosol discharging device 4 is a primary gelation tower 10 which is filled to the brim with a heated organic liquid which is of greater specific gravity and immiscible with said hydrosol. Thus, the hydrosol extruded from the orifices of the numerous tubes, while being divided spontaneously into spherical form, gradually rises up through said organic liquid owing to the difference in specific gravity to reach the liquid surface at the top of the tower 10.

The immiscible organic liquid which is charged to the primary gelation tower 10 thus must have a specific gravity greater than that of the hydrosol. At the same time, for gelling said hydrosol, it must be heated to a temperature which is at least higher than that of said hydrosol. This temperature to which the organic liquid is heated is chiefly determined by the gelation temperature of the hydrosol, but is also affected by the various other factors such as the size of the desired hydrogels and the height of the tower 10, i.e., the height of the organic liquid layer of tower 10 through which the hydrosol rises while being gelled, and the difference in the specific gravities between the hydrosol and the organic liquid, i.e., the speed at which the spherical particles rise up through the organic liquid. Of prime importance in designing the apparatus of this invention, however, is that the particles of hydrosol extruded from the orifices 8 of the hydrosol discharging device 4 must be hydrogelled at least sufficiently with respect to its surface by the time it reaches the liquid surface at the top of the tower 10 to such an extent that deformation or breakage does not occur of its ownself or by collision with each other when the formed spheres of the hydrosol have reached the surface of the organic liquid. Hence, the factors such as the temperature to which the immiscible organic liquid 11 is heated, the class (specific gravity) of the organic liquid, and the height of the tower 10 are determined in consideration of the foregoing requirements.

In addition, since the hydrosol extruded from the orifices 8 of tubes 7, immediately after extrusion from the orifices 8, is in a condition in which each of the spheres is in a liquid state, as the gelation thereof has not progressed at all, the deformation and destruction of the spheres occur by means of even a slight amount of external force. Again, as about the same tendency is seen in the state in which gelation has not proceeded fully, preferably no provisions should be made in the tower 10 of elements which would hinder the rise of the spheres so as to permit so far as possible the rise of the spheres to the surface of the organic liquid in their as-extruded state.

As described above, according to this invention, the hydrosol is extruded from the orifices 8 directly into an immiscible heated organic liquid 11, wherethrough the extruded hydrosol is made to rise to form primary spherical gels in the tower 10 by gelling. However, when orifices 8 of the discharging device 4 directly contacts said heated organic liquid 11 for a long period of time, troubles occur in that the hydrosol gels in the discharging device 4 and either constricts or clogs the passages of tubes 7 and/or orifices 8. Hence, according to this invention, it becomes necessary to ensure against gelling of the hydrosol inside the discharging device 4 by cooling said device, particularly the orifices 8 and/or tubes 7 thereof.

For this purpose, as shown in FIG. 4, in the apparatus of FIG. 1 there is provided substantially parallel to a top plate 5 of the discharging device 4 and at a point equal to the height of the tips of the tubes 7 a plate 9 provided with numerous holes the size of which are slightly larger than said tips, which thereby is adapted to cool the top plate 5, tubes 7 and orifices 8 of the discharging device 4 by introducing said immiscible organic liquid 11 which has been cooled from a cooling means 30 via pipe 31 into a zone between said plate 9 and the top plate 5 of discharging device 4 and then extruding this cooled immiscible organic liquid 11 into the inside of the tower 10 from between the holes of plate 9 and the periphery of the tubes 7.

Since, according to this invention, the hydrosol is extruded through orifices 8 into a heated organic liquid 11 from the bottom thereof, it is possible, as described hereinabove, to cool the discharging device, particularly the orifice portion thereof. If, on the other hand, the hydrosol is extruded downwardly from an extruding orifice immersed in the upper part of a heated organic liquid near its surface as in the conventional method, it would be practically impossible to cool the discharging portion, with the consequence that troubles such as clogging would occur, making operation over an extended period of hours utterly impossible. The reason is because the cooled organic liquid, on account of its specific gravity, would settle to the bottom while the heated organic liquid of lesser specific gravity would constantly rise to the surface of the liquid by means of convection.

Figure 16:
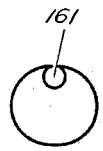
FIG. 16 is a magnified sectional view of the hydrogel formed when a hydrosol is gelled by being dropped into an immiscible, heated, organic liquid from a discharging means for the hydrosol, the orifices of which means are provided spaced apart from the liquid surface of the organic liquid.

On the other hand, if, for avoiding the foregoing defect, the orifices of the discharging device are disposed above the heated organic liquid with a distance separating the orifices from the surface of the liquid and the hydrosol is dropped to the surface of the heated organic liquid, almost simultaneously as the hydrosol plunges into the heated organic solution a navel-like depression would form in the hydrosol sphere as shown in FIG. 16. As the spherical hydrogel is formed without the disappearance of this navel-like depression to the last, the result is that this navel-like depression is retained in the product that is obtained by means of subsequent treatments, for example, in the spherical active alumina gel or silica gel, or the silica-alumina type gel, thereby bringing about a pronounced reduction in the pressure resistance intensity of the product, as already stated hereinbefore.

On the other hand, according to the present invention, the hydrosol is extruded through orifices 8 from the bottom upwardly into the organic liquid 11 and moreover, at this time, the hydrosol from orifices 8 first comes in contact with the cooled organic liquid 11 to thereafter gradually rise up through the heated organic liquid 11 whereat the gelation of the hydrosol gradually proceeds. Hence, since it is held in the liquid sol state for a sufficient time for formation of the sphere and in this state is gradually gelled, it becomes hydrogels of exceedingly perfect shaped spheres.

According to this invention, the primary hydrogels which have risen to the surface of the heated organic liquid 11 of the tower 10, as described above, is then, in the apparatus illustrated in FIG. 1–A, made to immediately flow automatically into a circular vessel 12. This mechanism will be described hereinafter with reference to FIGS. 2 and 3.

In the apparatus illustrated in FIG. 1–A, at the upper end of the primary gelation tower 10, an opening 16 is provided, as shown in FIG. 3, which is adapted to permit the inflow from the tower 10 via the opening 16 into a specified part of the circular vessel 12 of the organic liquid 11 accompanied by the primary hydrogels which have risen to the surface of said liquid.

As shown in FIG. 3, fixedly provided in concentric fashion at the upper end of the tower 10 is the circular vessel 12, into which middle the upper end 17 of tower 10 projects. The opening 16 is provided in a part of this projecting upper end 17. In the apparatus shown in FIG. 1–A, during its operation a cooled organic liquid 11 is constantly being fed to the lower end of the tower 10, and as hereinafter stated, likewise is fed a heated organic liquid 11 to the tower 10 at slightly above the middle part thereof. Therefore, the heated organic liquid 11 overflows from the opening 16 at the upper end 17 of tower 10 along with the primary hydrogels which have risen to the surface of the liquid and flows into the specified part of the circular vessel 12. Thus, the opening 16 can be regarded as constituting the intake port from the tower 10 of the primary hydrogels formed and the heated organic liquid.

Circular vessel 12 is an annular structure defined by its outer wall 12′ and the upper end 17 of tower 10 which constitutes its inner wall. Between the outer wall 12′ and the upper end 17 of tower 10 constituting the inner wall are provided in radial fashion a number of baffles 13 in contiguous relation with the foregoing members, which baffles are secured to a rotating shaft 14 by way of supporting arms 13′. Thus, baffles 13 are rotated at a slow speed in the circular vessel 12 by rotation of the rotating shaft 14 by means of a suitable power source with the intervention of meshing gear 15.

In consequence, the heated organic liquid and the primary hydrogels which have flowed into the circular vessel 12 from the upper end 17 of tower 10 flows throughout the circular vessel 12 from the specified portion of the inner wall 17 of said vessel to enter in succession the zones enclosed by a pair of baffles 13, 13. Hence, the hydrogels, while floating in the heated organic liquid, makes almost a complete circuit of the circular vessel 12 at a very slow speed along with the rotation of the baffles 13, and usually at a point immediately before the inlet 16, as seen from the direction of rotation, are discharged into an outlet passage 19 from outlet 18 provided in the outer wall 12′ of said circular vessel 12.

The baffles of the circular vessel 12 may be designed to rotate usually at the rate of from 2 minutes to a very slow speed of the order of 90 minutes in making one revolution, it being, of course, possible to operate at a speed slower or faster than this, as required.

The extent to which the primary hydrogels formed in tower 10 are gelled is, in general, only superficial or, at most, to that part of the interior near the surface. The core of spheres, for the most part, are still in the hydrosol state, the gelation of this part not having been completed as yet. The reason for this is because it would be necessary to construct an excessively high tower in order to gel in their entirety the spheres of hydrosol which have been extruded from orifices 8 of the hydrosol discharging device 4 during the time it rises up through the heated organic liquid in the tower 10, and this would not be commercially feasible.

Hence, the sole condition that is desired of the spherical hydrosol which is formed by being extruded from orifices 8 and then passes through the heated organic liquid of the primary gelation tower 10 is that the surface of the spherical hydrosol be hydrogelled to such an extent that the primary hydrogels which have risen to the surface of the organic liquid at the top of the tower (a) do not deform or break by themselves and (b) do not deform or disintegrate by the spheres colliding with each other. While it is, of course, desirable that the gelation proceeds beyond this state, it is commercially a disadvantage in that the tower height is increased so much more.

Thus, as hereinabove described, the primary spherical hydrogels which have been formed in tower 10 are not yet thoroughly gelled to the interior. Hence, if the organic liquid is immediately removed from these hydrogels and the other steps such as washing with water or treating with alkali is carried out, on account of the external force attending these operations, the greater part of the primary particles will be again deformed or destroyed. Though deformation does not occur at this time, unless the gelation of the spheres has been effected uniformly to their interior, it becomes in most cases the cause for the breakage of the gel during subsequent treatments.

On the other hand, according to this invention, as already hereinabove stated, the primary hydrogels are transferred immediately to the circular vessel 12 along with the heated organic liquid in a state in which they are floating on the latter, conveyed very slowly around the inside of the circular vessel concomitantly with the slow revolution of the baffles 13, during which time the hydrogelation of the primary spherical hydrogels takes place thoroughly to their interiors to be then discharged from outlet 18 into the outlet passage 19. Hence, the circular vessel 12 can also be referred to as the secondary gelation vessel.

Since, as hereinbefore stated, the gelation of the secondary spherical hydrogels which are discharged from outlet 18 of the circular vessel 12 must have proceeded uniformly to the interior of the spheres to an extent such that deformation or destruction thereof does not occur by means of the external force to which the spheres are subjected to in any of the subsequent steps such as the removal of the heated organic liquid, washing with water or treating with alkali, the rate at which the baffles 13 revolve in the circular vessel 12 should be suitably established in consideration of the nature of the hydrosol to be used as the stock solution, the size of the spheres, etc.

In addition, according to this invention, advantages such as presented below are attained by the employment of a circular vessel having numerous revolving baffles, as the secondary gelation vessel.

(1) Since all of the primary spherical hydrogels are secondarily gelled uniformly with uniform time, uniform hydrogel products having strength sufficient to withstand the subsequent operations to which the hydrogels are subjected to can be obtained. This is a very important matter. If a long trough or the like is employed, the uniform control of the treatment time according to particle size is not possible with the consequence that those whose secondary gelation time was insufficient do not attain sufficient strength. On the other hand, if the secondary gelation time is too long, softening or syneresis phenomenon occurs instead, as hereinbefore stated, whereby the product quality is notably lowered.

(2) Since the circular vessel, as above described, occupies only a very limited space, though the secondary gelation treatment is carried out over a considerably extended period of time, from the standpoint of its design it is highly advantageous.

Therefore, by doing as above in accordance with the present invention, it becomes possible by employment of a relatively simple apparatus to control uniformly the strict treatment conditions (treatment time, temperature conditions and handling of the spheres) and to prepare continuously good quality spherical hydrogels which are not susceptible to deformation, breakage, etc.

In the apparatus shown in FIG. 1, the spherical hydrogels thus formed and discharged to the outlet passage (secondary hydrogels) are then conveyed to an organic liquid separator consisting of rollers 21, 21' and a woven-wire conveyor 20 where the hydrogels are separated from the organic liquid, the separated hydrogels being collected in a hydrogel storage tank (not shown) via hopper 24. On the other hand, a major portion of the separated organic liquid is conveyed via hopper 22 and pipe 23 to a heating means 25, where it is, after being heated to the desired temperature, recycled to tower 10 via pipe 26, pump 27 and pipe 26', while a lesser portion of the organic liquid is recycled to the cooling means 30 via pipe 28, pump 29 and pipe 28', where, after cooling, it is used to cool the hydrosol discharging device 4, especially the orifices 8 thereof.

The system subsequent to the outlet passage 19 is, of course, not limited to that such as hereinabove described, but is capable of being suitably modified.

In FIGS. 5 to 7 are illustrated other embodiments, differing from that shown in FIG. 1 of the hydrosol discharging device, particularly of the cooling mechanism of the orifice part and the construction of the orifices.

FIGS. 5 to 7 each show only the bottom of the primary gelation tower 10 for the hydrosol and the essential parts of the hydrosol discharging device.

The apparatus of this invention, as shown in FIG. 5, may be cooled, for example at the bottom end of the tower at which the discharging device 4 is disposed from the outside of the tower by using a suitable coolant, e.g., cold water, air, or, say, gases such as ammonia, Freon, etc. The reference numeral 50 of FIG. 5 indicates a cooling means in which such a coolant is used.

On the other hand, the heating of the organic liquid 11 in this invention can be accomplished by providing a heating means 51 at a suitable location on the outside of tower 10, as shown in FIG. 5, and heat may be applied by a suitable means such as steam, Nichrome wire, etc. The heating means 25 of FIG. 1 and the heating means 51 of FIG. 5 may, of course, be used together.

When the cooling and heating are accomplished from the outside of the tower and hence the organic liquid is not particularly fed into the tower 10 from the outside, it becomes necessary to effect the transfer of the primary hydrogels into the circular vessel 12 from the opening 16 by a supplemental feeding of the organic liquid to the top of the tower. In such a case, it goes without saying that the organic liquid which is to be supplementally fed preferably should be heated to a temperature close to that desired.

In the apparatus illustrated in FIG. 6A, the lower part 10' of the primary relation tower 10 is of somewhat larger diameter than that of its upper part, and in this broadened part at the lower part 10' of the tower there is provided a cooling pipe 60 in coiled fashion. The hydrosol discharging device 4 also differs from that shown in FIG. 1 in that there are no tubes 7, the orifices 8 being directly drilled in the top plate 5.

On the other hand, the embodiment shown in FIG. 7 is not provided with a plate 9 having numerous holes and pipe 31 for feeding the cooled organic liquid. Instead, the hydrosol feed pipe 2 is cooled directly by means of a cooler 70. Hence, in this embodiment shown in FIG. 7, the hydrosol itself cools the discharging device 4, tubes 7 and orifices 8, thus preventing the clogging of the orifices 8.

As shown in FIGS. 5, 6A, 6B and 7, the construction of the hydrosol discharging device and its cooling means is optional. The essential point is that the orifices 8 and/or the hydrosol passing therethrough are maintained at such a temperature that the hydrosol will not cause clogging of the orifices 8 of the discharging device by being affected by the heated organic liquid 11.

Figure 8:
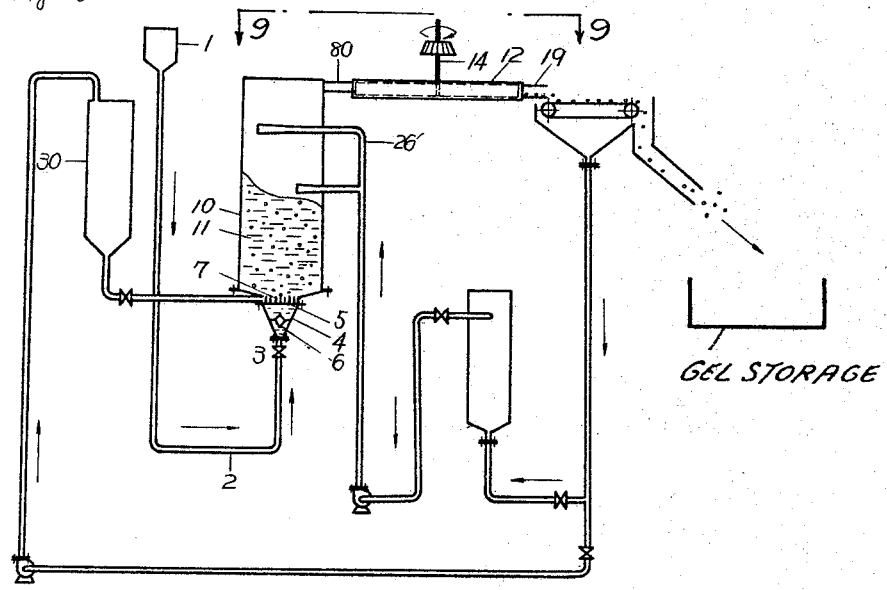
Figure 10:
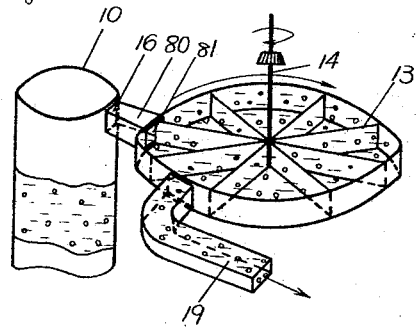

FIGS. 8, 9 and 10 illustrate yet another embodiment differing from that shown in FIG. 1.

The apparatus of FIG. 8 is substantially the same in construction as that shown in FIG. 1, with the exception that no provision is made of the plate 9 having numerous holes which is disposed at about the upper tips of the tubes 7 nor is the circular vessel 12 provided concentrically at the top of tower 10, it being provided in a position laterally of the top of tower 10 on substantially the same level therewith with a trough 80 intervening. Trough 80 is, of course provided in a position in alignment with the opening 16 at the upper end of tower 10 shown in the apparatus of FIG. 1. Hence, the primary hydrogels formed at the tower 10 and the heated organic liquid 11 overflow into trough 80 from opening 16 and flow into said circular vessel 12 from its inlet port 81.

The cooling effect in the case of the apparatus shown in FIG. 8 will be somewhat inferior to that of FIG. 1 since, as hereinabove described, a plate 9 having numerous holes is not provided as a cooling means. Its construction, however, is simpler; and even by means of a cooling means of such a construction as this the clogging of orifices 8 by the hydrosols can be prevented. In this case, the cooled organic liquid may be fed to the tower bottom from two or more outlets by branching the supply pipe 31.

Even though the apparatus shown in FIG. 8 is employed, advantages completely the same as in the case of employment of the apparatus of FIG. 1 can be attained.

Figure 12:
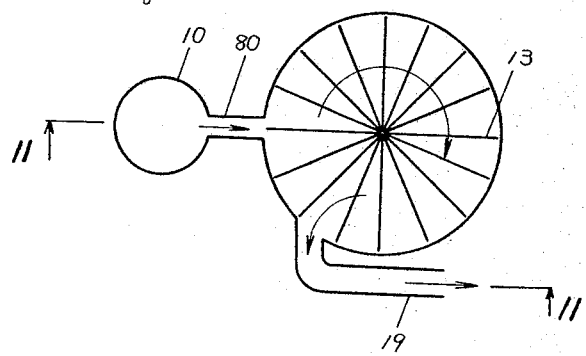
Figure 11:
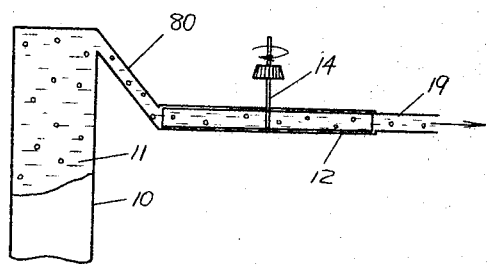

In the embodiment shown in FIGS. 11 and 12 the circular vessel 12 is disposed at a position somewhat lower than the top of tower 10. Hence, the trough 80 is inclined; otherwise it is exactly the same as the apparatus shown in FIG. 8.

Figure 14:
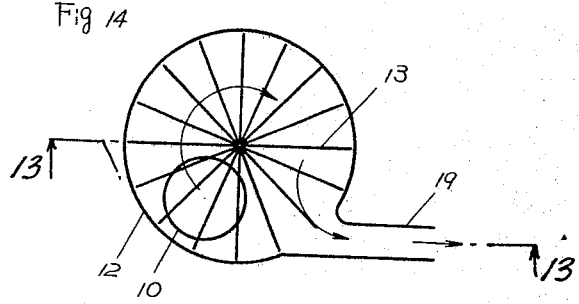
Figure 13:
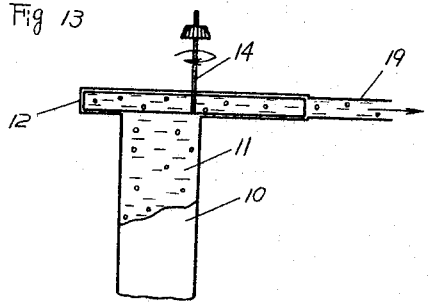

While in the embodiment shown in FIGS. 13 and 14 the circular vessel 12 is directly mounted on top of tower 10, similarly as in the embodiment shown in FIGS. 1 and 2, in contrast to the case of the apparatus illustrated in FIGS. 1 and 2 in which the center of tower 10 and that of circular vessel 12 coincide, in the case of the former the circular vessel 12 is mounted eccentrically relative to tower 10. The hydrogels which have risen to the surface of the organic liquid enters the circular vessel directly. Thus, in this instance, the whole of that part of tower 10 and the circular vessel 12 where they meet each other corresponds to opening 16 in FIG. 1. The other portions are completely the same as those of FIG. 1.

Figure 15:
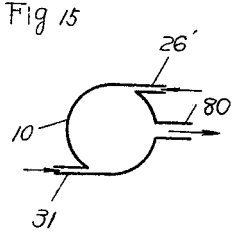
FIG. 15 is a view showing an embodiment of a preferred setup when introducing a heated and/or cooled organic liquid into the primary gelation tower.

FIG. 15 illustrates the manner in which the pipe 31 connected to the bottom of tower 10 and employed for feeding the cooled organic liquid and the one or more pipes 26' connected to the middle and/or upper parts of tower 10 and employed for feeding the heated organic liquid, are connected tangentially to the inner wall surface of tower 10.

When pipes 31 and/or 26' are disposed in this manner such that they are tangential to the inner wall surface of tower 10, the organic fluid by its being fed into tower 10 sets up a swirling stream in the inside thereof.

If a swirling stream such as this is not set up in the organic fluid in tower 10, there is the danger that the spherical particles of hydrosol formed from the hydrosol extruded from the numerous orifices 8 of discharging device 4 and a portion of said hydrogel spheres which are in a state in which their relation has not proceeded so much would come in contact with the inner wall of tower 10 and thus becoming deformed or broken and adhere to the inner wall. However, by setting up a swirling stream as hereinabove described, the occurrence of troubles such as this can be prevented almost completely. Therefore, it is highly desirable in this invention to fit pipes 31 and/or 26′ to tower 10 as in FIG. 15.

While the invention has been described with particular reference to specific embodiments, it is to be understood that it is not to be limited thereto but is to be construed broadly and restricted solely by the scope of the appended claim.

Spherical active alumina gel, spherical silica-alumina type gel and spherical silica gel can be obtained from the spherical hydrogels obtained by using the starting materials, method and apparatus such as hereinabove described by carrying out the following simple after treatments.

Namely, when the ratio on a weight basis of the $Al_2O_3$ and $SiO_2$ contained in the stock hydrosol, i.e., the $Al_2O_3/SiO_2$, is less than 30/70, spherical silica-alumina type gels of high pressure resistance intensity can be made by merely washing the resulting spherical hydrogels thoroughly with water followed by drying at a temperature above 110° C. This spherical silica-alumina type gel which has excellent catalytic activity and moisture adsorption capacity is employed industrially as a cracking catalyst for gasolene or as a desiccant.

Pure spherical silica gels not containing alumina are obtained readily by treating with an acid to extract the alumina from the silica-alumina type hydrogels made as described above and containing a small amount of alumina. For example, if hydrogels the $Al_2O_3/SiO_2$ of which, on a weight basis, 4.0/96.0 are immersed in sulfuric acid of 3% concentration and heat treated therein for 5 hours at 60° C. followed by washing with water, pure spherical silica hydrogels are obtained. By drying these hydrogels, they become spherical silica gels.

In the case of those silica-alumina type hydrogels whose $Al_2O_3$ content is greater than when $Al_2O_3/SiO_2$ is 30/70, on a weight basis, or the alumina type hydrogels not containing $SiO_2$, even though washing with water is thoroughly carried out, the sulfate radical bonded to alumina and not capable of being washed out with water remains behind in the hydrogel. Hence, in the case of these hydrogels containing alumina relatively in excess, in contrast to the case of the hereinbefore described silica-rich hydrogels, it is not possible to make these hydrogels into spherical active gels by the treatments of merely washing with water and drying. When there is present in the hydrogel the sulfate radical which cannot be removed only by washing with water, spherical silica-alumina gels or spherical active alumina gels having great catalytic activity and moisture adsorption capacity can be obtained either by treating the hydrogels with dilute ammonia water or by heat treating them with an aqueous solution of a substance having neutralizing capacity such as urea or tetramethylene hexamine to convert the sulfate radicals to water-soluble sulfate ions which are then removed from the hydrogels by washing with water and thereafter drying the hydrogels. These spherical gels have high pressure resistance intensity and hence are employed industrially as catalysts and desiccants in the various petrochemical or natural gas chemistry fields.

Example 1

Powdered limestone passing a 200 mesh sieve (Tyler standard sieve) was rendered pasty with a small amount of water. This was added with vigorous stirring to an $Al_2(SO_4)_3$ aqueous solution gradually over a 24-hour period at room temperature at the rate of 225 kg. of the former to one kl. of the latter to obtain after completion of the reaction as a supernatant liquid a hydrosol of basic aluminum sulfate at the rate of 0.65 kl. The composition of this hydrosol contained per 100 cc. of the liquid 11.47 grams as $Al_2O_3$ and 10.42 grams as $SO_3$ and hence $SO_3/Al_2O_3$ on a molar basis was 1.16. Its pH was 3.62 and specific gravity was 1.238. This reaction expressed by an equation is as follows:

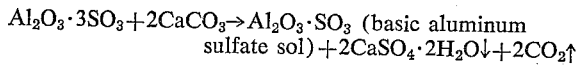

$$Al_2O_3 \cdot 3SO_3 + 2CaCO_3 \rightarrow Al_2O_3 \cdot SO_3 \text{ (basic aluminum sulfate sol)} + 2CaSO_4 \cdot 2H_2O\downarrow + 2CO_2\uparrow$$

Using this hydrosol as the starting material, spherical hydrogels were made employing the following apparatus and conditions:

Apparatus, as illustrated in FIGS. 1, 2 and 3, in which tower 10 has an inside diameter of 120 cm. and a height of 450 cm.; circular vessel 12 has a diameter of 280 cm. and a height of 37 cm.; baffles 13 have lengths of 80 cm. and heights of 21 cm. and the baffles make one revolution in 8 minutes; tubes 7 provided in the discharging apparatus 4 number 100; the diameter of the orifices 8 at the top end of tubes 7 is 5.8 mm. and the distance between top plate 5 and plate 9 shown in FIG. 4 is 6 cm.

For the organic liquid for filling this apparatus a mixture of 83 vol. percent trichlorobenzene and 16 vol. percent kerosene was used, the specific gravity of which at 20° C. was 1.356 and at 90° C. was 1.282.

The temperature of the organic liquid flowing into the bottom of tower 10 from cooling means 30 via pipe 31 was 16° C. and the rate of flow was 3.5 l./min.

The temperature of the organic liquid introduced via pipes 26′ into tower 10 (in the present example the pipes 26′ are disposed such that introduction of the liquid is made at two places of tower 10, i.e., at the upper end as well as the middle thereof) from heating means 25 after being heated thereat was 85° C. and the combined rate of flow of the two pipes was 80 l./min.

The temperature distribution in tower 10 during operation was: 20° C. in the vicinity of orifices 8, 64° C. in the middle part of tower 10 and 83° C. at the top thereof. In this case, with the rising speed of the stock sol being 10 cm./sec. the time required for the hydrosol discharged into the bottom of the tower to reach the top is about 45 seconds.

By operating continuously for 240 hours under the foregoing conditions in which was extruded from the discharging orifices a total of 194 kl. of the stock hydrosol, it was possible to obtain hydrogels 13–15 mm. in diameter exhibiting almost perfect spherical shape at a yield of 100%. The loss in the organic liquid by adherence of the liquid to the hydrogels in this instance was only 0.6 kl.

The so obtained hydrogels were placed in a tank having a perforated dish in the bottom thereof and washing with water was carried out by introducing water from the top of the tank and allowing it to flow out the bottom thereby removing so far as possible the sulfate ions contained in the hydrogels. The water in the tank was then circulated while being heated to 50° C., and concentrated ammonia water was added dropwise to gradually raise the pH of the circulating liquid to 9.2 over a period of 10 hours. This was then followed by washing the hydrogels with water until no sulfate ions could be observed in the washing water, followed by drying and then calcination at 550° C. whereby spherical active alumina gels of diameters 4.5–5.5 mm. and exhibiting a pressure resistance intensity of 140 kg. were obtained. The term "pressure resistance intensity" refers to the load at which a particle is crushed when it is placed between two sheets of parallel metallic plates and pressure is gradually applied.

Example 2

Finely powdered limestone was gradually added with vigorous stirring to an aluminum sulfate solution of the following composition containing Fe and Mg as impurities, at the rate of 150 kg. of the former to 1 kl. of the latter, whereby was obtained after completion of the reaction, as a supernatant liquid, a basic aluminum sulfate sol of the following composition at the rate of 0.74 kl.

hydrosol discharged into the bottom of the tower arrives at the top thereof takes about 63 seconds.

After operating continuously for 168 hours, hydrogels of a diameter 16–20 mm. and of almost perfect spherical shape were obtained at a yield of 100% from a total of

|  | Content By Weight per 100 cc. of Liquid (g.) | | | | $SO_3/Al_2O_3$ on a Molar Basis | Specific Gravity | pH |
|---|---|---|---|---|---|---|---|
|  | $Al_2O_3$ | $Fe_2O_3$ | MgO | $SO_3$ |  |  |  |
| Aqueous aluminum sulfate solution | 8.79 | 1.33 | 2.59 | 25.09 | 2.69 | 1.472 | 1.88 |
| Basic aluminum sulfate sol | 9.47 | 1.51 | 2.45 | 15.21 | 1.19 | 1.354 | 3.75 |

In the above table the $SO_3/Al_2O_3$ on a molar basis represents the molar ratio of $SO_3$ to $Al_2O_3$ wherein the $SO_3$ is that remaining after the $SO_3$ regarded as adhering to $Fe_2O_3$ and MgO has been substracted from the total $SO_3$. Further, the reason why the basic aluminum sulfate sol is somewhat more concentrated than the stock aluminum sulfate solution is because when the limestone powder is added and gypsum is formed the gypsum takes up crystalline water.

Separately sodium silicate (concentration 13%) of a specific gravity 1.116, the $SiO_2/Na_2O$ on a molar basis of which is 2.95 was gradually added to sulfuric acid (concentration 32%) of a specific gravity 1.242 at the rate of 3.5 kl. of the former to 1 kl. of the latter to make a silica sol of a pH 1.17 and specific gravity 1.139 and containing per 100 cc. thereof 8.50 grams of $SiO_2$.

The stock hydrosol was prepared by mixing 100 parts by volume of basic aluminum sulfate sol, 8.5 parts by volume of silica sol and 50 parts by volume of water. In this case, however, the basic aluminum sulfate sol and the silica sol are each stored separately and those which have been mixed are immediately fed in a continuous fashion to the granulation apparatus.

The pH of the stock hydrosol was 3.60 and its specific gravity was 1.200.

Using the foregoing stock hydrosol spherical hydrogels were made in the apparatus illustrated in FIGS. 13 and 14 under the following conditions:

| | |
|---|---|
| Diameter of tower 10 _____cm__ | 100 |
| Height of tower 10 _____cm__ | 380 |
| Temperature of organic liquid at bottom of tower, ° C. _____ | 22 |
| Temperature of organic liquid at middle part of tower, ° C. _____ | 68 |
| Temperature of organic liquid at top of tower, ° C. _____ | 92 |
| Rate of flow into tower 10 of cooled organic liquid _____l./min__ | 3.0 |
| Temperature of cooled organic liquid, ° C. ____ | 17 |
| Rate of flow into tower 10 of heated organic liquid _____l./min__ | 70 |
| Temperature of heated organic liquid, ° C. ____ | 95 |
| Diameter of orifices of discharging device mm__ | 6.0 |
| Number of orifices in discharging device _____ | 68 |
| Diameter of circular vessel _____cm__ | 220 |
| Height of circular vessel _____cm__ | 30 |
| Length of baffles 13 _____cm__ | 109.5 |
| Height of baffles 13 _____cm__ | 25 |
| Time required for baffles 13 to make one revolution _____min__ | 15 |
| Type of organic liquid, ortho-dichlorobenzene. | |
| Rate of discharge of stock hydrosol ____l./min__ | 8.5 |

The discharging device for the stock hydrosol and the means whereby the cooled and heated organic liquids flow into tower 10 are as illustrated in FIGS. 1, 2 and 3.

Since the rate at which the stock hydrosol rises in the tower averages 6 cm. per second, the time in which the hydrosol discharged into the bottom of the tower arrives at the top thereof takes about 63 seconds.

71.7 kl. of the stock hydrosol. The loss in the organic liquid during this time was only 350 l.

These spherical hydrogels were placed in a tank having a perforated dish in the bottom thereof, and washing was carried out by introducing water from the top of the tank and allowing it to flow out the bottom thereby removing the Fe and Mg salts as well as the sulfate ions that are capable of being washed out which are contained in the hydrogels. The hydrogels are then heat treated for 8 hours at 80° C. with a urea liquor, and, after draining off the liquid, treated with ammonia water at 50° C. to convert the residual sulfate radicals in the hydrogel to sulfate ions which are completely removed by washing with water. The hydrogels are then dried, after which they are calcined at 500° C. thereby yielding spherical silica-alumina type gels 6.5–8.5 mm. in diameter exhibiting a pressure resistance intensity of 100 kg.

*Example 3*

Commercially available sodium silicate the $SiO_2/Na_2O$ on a molar basis of which was 2.95 was diluted with water to make a solution whose specific gravity was 1.162. This sodium silicate solution while being cooled was gradually added dropwise to sulfuric acid having a specific gravity of 1.242, the addition being made at the rate of 4.8 kl. of the former to 1 kl. of the latter whereby was made a silica sol having a pH of 2.95 and a specific gravity of 1.175 and containing per 100 cc. thereof 12.6 grams of $SiO_2$.

97 parts by volume of this silica sol was mixed with 3 parts by volume of the basic aluminum sulfate sol of Example 1 to make a hydrosol having a pH of 3.42 and a specific gravity of 1.164. Using this stock hydrosol, spherical hydrogels were made in the apparatus shown in FIGS. 8, 9, and 10 under the following conditions:

| | |
|---|---|
| Diameter of tower 10 _____cm__ | 164 |
| Height of tower 10 _____cm__ | 410 |
| Temperature of the organic liquid at the bottom of the tower, ° C. _____ | 24 |
| Temperature of the organic liquid at the middle part of the tower, ° C. _____ | 69 |
| Temperature of the organic liquid at the upper part of the tower, ° C. _____ | 82 |
| Rate of flow of the cooled organic liquid into tower 10 _____l./min__ | 1 |
| Temperature of the cooled organic liquid, ° C. __ | 15 |
| Rate of flow of the heated organic liquid into tower 10 _____l./min__ | 170 |
| Temperature of the heated organic liquid, ° C. _____ | 86 |
| Diameter of the orifices of discharging device mm__ | 5.0 |
| Number of orifices in discharging device _____ | 128 |
| Diameter of circular vessel 12 _____cm__ | 216 |
| Height of circular vessel 12 _____cm__ | 25 |
| Length of baffles 13 _____cm__ | 108 |
| Height of baffles 13 _____cm__ | 15 |
| Time required for baffles 13 to make one revolution _____min__ | 11 |

Type of organic liquid—Mixed liquid of 71 vol. percent trichlorobenzene and 29 vol. percent kerosene.

Specific gravity of organic liquid:
- at 20° C. _____ 1.278
- at 90° C. _____ 1.206

Rate of discharge of stock hydrosol____l./min__ 10

Since the rate at which the stock hydrosol rises through the organic liquid averages 11 cm./sec., the time that the hydrosol discharged into the bottom of the tower 10 to reach the top thereof takes about 37 seconds.

By operating continuously for 7 days 100 kl. of stock hydrosol was made into hydrogels 9–13 mm. in diameter of almost perfect spherical shape at a yield of 100%.

When these spherical hydrogels were placed in a tank provided at its bottom with a perforated dish and water was introduced from the top of the tank and allowed to flow out from the bottom thereof thereby removing $Na'$, $Al'''$, $SO_4^=$, etc. and thereafter calcined at 150° C., spherical silica-alumina type gels 4–6 mm. in diameter containing a small amount of alumina and having high moisture adsorption capacity and a pressure resistance intensity exceeding 80 kg. were obtained.

Again, when the same spherical hydrogels were immersed in a 2% sulfuric acid solution before drying, heated for 8 hours at 50° C., washed, thereby extracting and removing the alumina contained, and thereafter dried at 150° C., spherical silica gels 4–6 mm. in diameter having a pressure resistance intensity exceeding 70 kg. and still greater moisture adsorption capacity were obtained.

Example 4

The same procedures as in Example 2 were followed in preparing the basic aluminum sulfate sol and silica sol of the following composition:

|  | Content per 100 cc. of Liquid (g.) | | | | | $SO_3/Al_2O_3$ (molar basis) | Specific Gravity | pH |
|---|---|---|---|---|---|---|---|---|
|  | $Al_2O_3$ | $Fe_2O_3$ | MgO | $SO_3$ | $SiO_2$ | | | |
| Basic aluminum sulfate sol | 15.61 | 0.17 | 0.42 | 13.60 | | 1.02 | 1.262 | 3.69 |
| Silica sol | | | | | 9.78 | | 1.140 | 0.96 |

Fifty parts by volume of basic aluminum sulfate sol and 50 parts by volume of silica sol were mixed to make a stock hydrosol having a pH of 3.12 and a specific gravity of 1.200. In this case, the basic aluminum sulfate sol and the silica sol are stocked separately, however, and as soon as the stock hydrosol was mixed, it was caused to be discharged immediately into tower 10 from the discharging device 4 via the cooling means 70 shown in FIG. 7.

The apparatus employed in this example was provided with the cooling means for the stock hydrosol, as shown in FIG. 7, but, on the other hand, did not have the means for cooling the organic liquid and introducing it from the bottom of tower 10. The upper half of tower 10 was identical to that shown in FIGS. 8, 9 and 10. The conditions under which the experiment was carried out was as follows:

- Diameter of tower 10 _____cm__ 60
- Height of tower 10 _____cm__ 240
- Temperature of the organic liquid at the bottom of the tower, ° C. _____ 6
- Temperature of the organic liquid at the middle part of the tower, ° C. _____ 55
- Temperature of the organic liquid at the top of the tower, ° C. _____ 72
- Rate of flow of the heated organic liquid into tower 10 _____l./min__ 30
- Temperature of heated organic liquid, ° C. _____ 85
- Diameter of the orifices of discharging device _____mm__ 5.0
- Number of orifices in the discharging device _____ 15
- Diameter of circular vessel 12 _____cm__ 140
- Height of circular vessel 12 _____cm__ 18
- Length of baffles 13 _____cm__ 70
- Height of baffles 13 _____cm__ 14
- Time required for baffles 13 to make one revolution _____min__ 4

Type of organic liquid—Mixed liquid of 75 parts (vol.) trichlorobenzene and 25 parts (vol.) spindle oil.

Specific gravity:
- at 20° C. _____ 1.335
- at 80° C. _____ 1.260

Temperature of stock hydrosol at time of discharge into tower 10, ° C. _____ −2

Rate of discharge of stock hydrosol _____l./min__ 3

Since the rate at which the stock hydrosol rises through the organic liquid averages 12 cm./sec., the time in which the hydrosols discharged into the bottom of the tower reaches the top thereof takes about 20 seconds.

By operating continuously for 2 days, 8.64 kl. of the stock hydrosol was made into hydrogels 5–8 mm. in diameter of almost perfect spherical shape, at a yield of 100%.

These spherical hydrogels were placed in a tank provided with a perforated dish in its bottom and water was introduced into the tank from the top and allowed to flow out from the bottom, thereby removing so far as possible the sulfate radicals contained in the hydrogels. Then a solution of ammonium acetate of 0.1 mol/l concentration heated to 60° C. was added dropwise into the tank from the top thereof and drawn off from the bottom. The pH at the outlet of the tank was initially 4.9 but finally became 7.15. Thereafter the hydrogels were washed with water, and after the sulfate ions had disappeared from the hydrogels, they were dried at 200° C. whereby was obtained spherical active silica-alumina gels 2.0–3.0 mm. in diameter exhibiting a pressure resistance intensity of 60 kg.

What is claimed is:

An apparatus for preparing spherical solid hydrogels which comprises a vessel containing a heated water-immiscible liquid having a means for passing said water immiscible liquid to a primary gelation tower, and a discharging means for discharging a stock solution to be hardened into said heated water immiscible liquid in said primary gelation tower, said discharging means having a plurality of orifices for discharging said stock solution, said orifices being provided on the bottom of said primary gelation tower in direct contact with said water-immiscible liquid at a portion of the bottom layer of said liquid, said water-immiscible liquid having a specific gravity greater than that of said stock solution, a cooling means for cooling said stock solution before said stock solution passes through said orifices into said primary gelation tower, said primary gelation tower further provided at its uppermost portion with a circular hardening vessel, said circular hardening vessel having an inlet for inflow of the formed, spherical hydrogels together with the heated water-immiscible liquid at the top of said primary gelation tower, said circular hardening vessel having an outlet for discharging said particles as well as being provided with rotatable baffles wherein said circular hardening vessel is partitioned into a plurality of sections, thereby keeping said formed, spherical gelated particles which are formed in said primary gelation tower for a certain length of time in the heated water-immiscible liquid.

References Cited
UNITED STATES PATENTS

| | | | |
|---|---|---|---|
| 2,422,499 | 6/1947 | Pierce et al. | 252—317 X |
| 2,446,783 | 8/1948 | Payne | 252—359 |
| 2,449,253 | 9/1948 | Sargent | 252—317 |
| 2,463,467 | 3/1949 | Marisic | 252—317 |
| 2,474,911 | 7/1949 | Pierce et al. | 252—317 X |
| 3,023,171 | 2/1962 | Smith | 252—359 |
| 3,079,761 | 3/1963 | Toulmin | 62—58 |

NORMAN YUDKOFF, *Primary Examiner.*

JULIUS GREENWALD, *Examiner.*

R. D. LOVERING, J. SOFER, *Assistant Examiners.*